July 31, 1962 C. J. BEER 3,046,931
ADJUSTABLE GRADUATIONS FOR INSTRUMENT DIAL
Filed Feb. 8, 1961
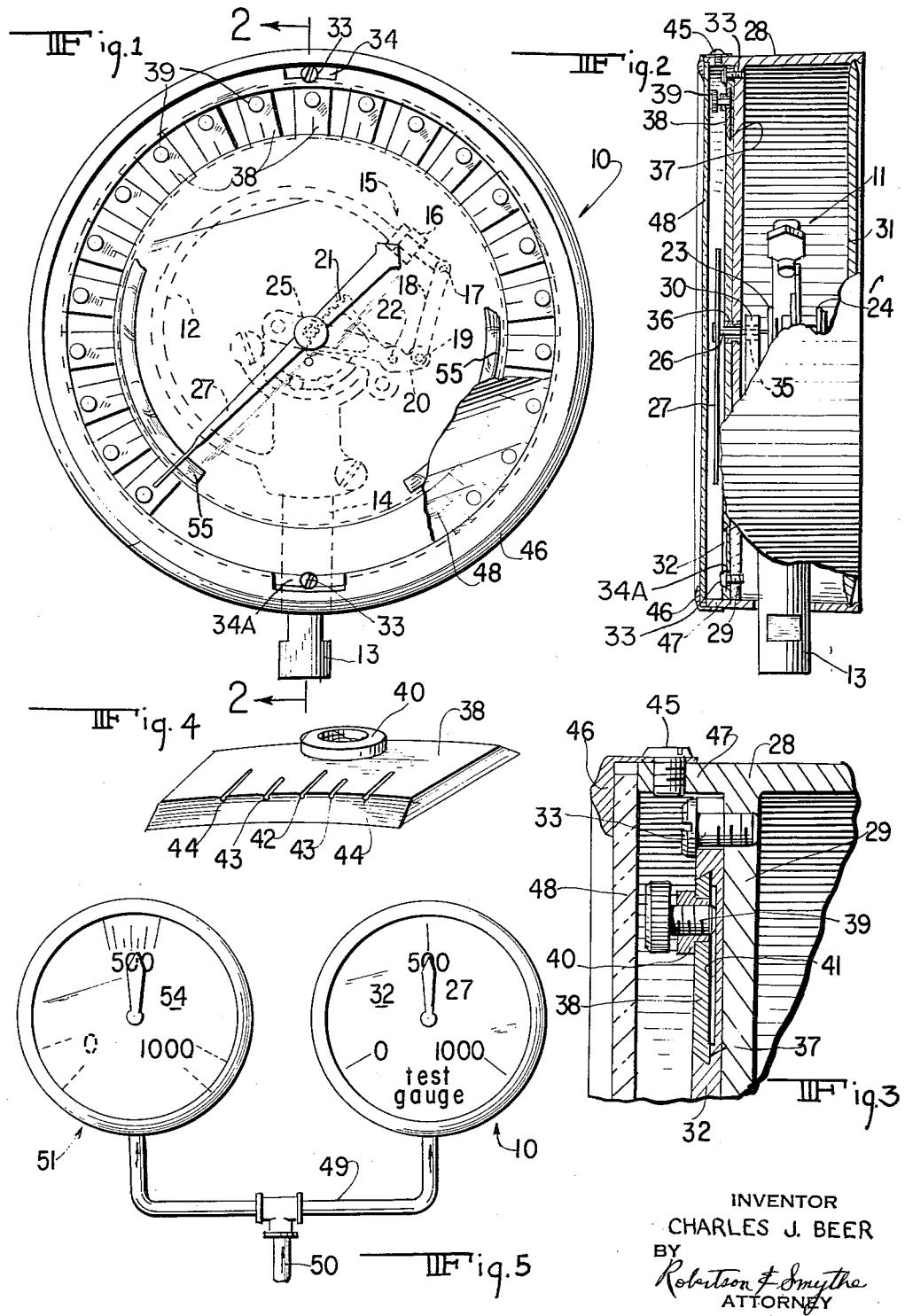
INVENTOR
CHARLES J. BEER
BY
Robertson & Smythe
ATTORNEY

United States Patent Office 3,046,931
Patented July 31, 1962

3,046,931
ADJUSTABLE GRADUATIONS FOR
INSTRUMENT DIAL
Charles J. Beer, Sellersville, Pa., assignor to
Ametek, Inc., a corporation of Delaware
Filed Feb. 8, 1961, Ser. No. 87,919
5 Claims. (Cl. 116—129)

This invention relates to an instrument dial and particularly to one in which the position of the graduations may be adjusted.

Instruments having dials with fixed graduations normally show an error at one or more points over the range of the instrument. Upon the initial calibration of the instrument at the time of manufacture and later upon recalibration, the sensitive element, the movement, or both are adjusted to obtain the least error over the operating range. Normally the error can be held within limits which are suitable for the particular use for which the instrument is intended. In some applications, however, the required accuracy may exceed that which can be obtained from such adjustments. For example, in the field of pressure gauges, test gauges are employed as the means of calibrating other gauges. The test gauge which is a master gauge is a precision instrument having a far greater degree of accuracy than that of the gauges which are to be calibrated to it. Even in test gauge devices, the very nature of the mechanical apparatus results in errors at one or more locations in its range. Obviously, if the errors are present at the points to which other devices are calibrated the test gauge error will be introduced into them.

One of the objects of the invention is to provide an instrument dial which is adjustable in order that the graduations of the dial may be placed in register with the instrument pointer when the pointer is at a position corresponding to the indication of the graduation.

In one aspect of the invention, the adjustable instrument dial includes dial plate means and pointer means adapted to be moved with respect to it. Movable tab means are disposed in a groove means within the dial plate adjacent the path of travel of the pointer means. Graduation means are provided on the tab means. The instrument dial is adjusted by moving the tab means with respect to the dial plate means so as to place the graduation means thereon in register with the pointer means when the pointer means is at a position corresponding to the indication of said graduation means.

In another aspect of the invention the adjustable instrument dial includes a dial plate means and a pointer means with the dial plate means being adjustably positioned with respect to the pointer means. The dial plate contains groove means disposed adjacent to the path of travel of the pointer means. Movable tab means having graduation means are adapted to be retained in the groove means substantially flush with the surface of the dial plate. The instrument dial is adjusted by moving the tab means in the groove means until the graduation means are brought into register with the pointer means.

These and other objects, advantages and features of the invention will become apparent from the following description and drawings which are merely exemplary:

In the drawings:

FIG. 1 is a front view of a pressure gauge having the window thereof partially broken away to show an adjustable dial embodying the principles of the invention;

FIG. 2 is a sectional view of the gauge with the adjustable dial, taken along the line 2—2 of FIG. 1;

FIG. 3 is an enlarged fragmentary view of the gauge shown in FIG. 2 showing a tab locked in position in the groove of the dial plate;

FIG. 4 is an enlarged perspective view of one of the tabs; and

FIG. 5 shows a test gauge and a gauge which is to be calibrated by the test gauge.

The instrument to be provided with an adjustable dial may include pressure gauge 10 in which movement 11 is operated by Bourdon tube 12 (FIG. 1). Fluid pressure is applied to connector 13 which leads to socket 14 to which Bourdon tube 12 is connected. In the conventional manner an increase of the fluid pressure applied to the Bourdon tube results in the outward deflection of its free end 15 to which is attached tip 16. The motion of tip 16 is transmitted through link rivet 17 to link 18 which in turn is connected by link rivet 19 to segment 20. Segment 20 with gear teeth 21 is pivoted about arbor 22 which is supported between upper and lower movement plates 23 and 24, respectively. Gear teeth 21 transmit the movement of segment 20 to pinion 25 in mesh therewith and thereby to shaft 26 upon which pointer 27 is mounted. Pressure gauge 10 includes case 28 having front wall 29 to which is attached on its near surface, bracket 30 of socket 14 in order to position movement 11 within the case. The interior portion of case 28 containing movement 11 is closed at the rear by means of cover 31.

Dial plate 32 is adjustably mounted on the front surface of front wall 29 by means of the heads of screws 33 which extend through adjusting slots 34, 34A in the dial plate 32 and engage threaded openings in front wall 29. Shaft 26 which carries pointer 27 at its free end extends from movement 11 through a clearance opening 35 and thence through a clearance opening in bushing 36 which centers dial plate 32 upon front wall 29 (FIG. 2).

Dial plate 32 contains groove 37 (FIG. 3) which preferably is of dove-tail form. Tabs 38 which have the form of a segment are adapted to be inserted into groove 37 via slot 34A and retained in the groove by locking screws 39. Each tab is dimensioned to extend over a portion of the path of travel of pointer 27. Consequently, in order to provide a plurality of indications of the position of pointer 27 it is necessary that a plurality of tabs 38 be provided in groove 37. The tabs may be locked in position at predetermined locations on dial plate 32 by means of locking screws 39 which are supported by a threaded attachment in bushings 40 of tabs 38. Grooves 37 may be provided with undercut portion 41 which is engaged by the free end of locking screws 39 and serves to minimize the friction upon tabs 38 when they are to be moved within groove 37. In order that pointer 27 be close to the surface of tabs 38 while still maintaining the substantially flat appearance of dial plate 32, tabs 38 preferably are of a thickness substantially equal to the depth of groove 37. Thus, the tabs are adapted to be inserted in groove 37 with their outer surface substantially flush with that of the dial plate.

Each of the tabs is provided with graduations for a portion of the movement of pointer 27. Graduation 42 at the center portion of tab 38 may be positioned in register with pointer 27 so as to correspond to a predetermined pressure level which it is desirable to indicate. Graduations 43 and 44 adjacent to center graduation 42 may be positioned to indicate pressure levels above and below that of the center graduation of a predetermined value. In the case where pressure gauge 10 is to be used as a test gauge, tabs 38 may be positioned at locations about the dial plate 32 which correspond to the number of points at which it is intended to utilize the test gauge pressure readings. For example, as shown in FIG. 1, the test gauge may be one having a range of 0 to 1000 p.s.i. with each of the tabs corresponding to 50 p.s.i. increments of the total range of the instrument.

In order to eliminate the introduction of parallax errors in reading the instrument, mirrored surface 55 is disposed on dial plate 32 adjacent to the path of travel of the end of pointer 27. When reading the instrument, the position of the observer's eyes is moved until the image of the pointer in mirrored surface 55 underlies and is masked by the pointer. Such a condition insures that the observer is looking substantially perpendicularly to the plane of the dial plate so that a correct reading is obtained. This arrangement also insures that different observers will interpret a given pointer position as one reading.

In order to calibrate the test gauge, the operator first removes screws 45 which position bezel 46 about flange 47 of case 28. Window 48 is then removed to expose the dial plate and tabs. Known pressures from a precision source, such as dead-weight testing apparatus, are then applied to the test gauge at increments corresponding to those of the tabs. If all of the tabs need be moved in the same direction and to a substantially similar degree, screws 33 may be loosened and dial plate 32 shifted in the proper direction about bushing 36 in order to bring the tabs into register substantially with the pointer.

Normally further adjustment of the tabs is required. Consequently, the increments of pressure would again be applied to the gauge. Upon each application of pressure locking screw 39 of tab 38 adjacent to pointer 27 is loosened so that graduation 42 can be placed in register with pointer 27. Locking screw 39 is then tightened against undercut portion 41 to secure tab 38 in place. Upon each incremental increase in pressure the adjustment of the tab adjacent to the pointer is repeated.

In this manner it is evident that the test gauge can be calibrated to be without error at the plurality of test points corresponding to the tabs. Graduations 43 and 44 preferably are proportioned to correspond to pressure levels at a predetermined difference from that of center graduation 42. These differences may correspond to a percentage of the full scale reading of the test gauge, such as one-quarter, one-half or one percent. With this arrangement of graduations, a test gauge can be checked against a pressure reference at any time and a direct reading of the error at each of the test points corresponding to the tabs may be directly indicated.

As shown in FIG. 5, the test gauge may be attached to manifold 49 which leads to pipe 50 of a pressure source (not shown). Gauge 51, which is to be calibrated, is also mounted upon manifold 49. The operator then applies incremental changes in pressure as indicated by test gauge 10 and subsequently adjusts gauge 51 so that its pointer is in register with the proper one of graduations 53 on dial 54. This procedure would be continued for the full range of gauge 51.

It should be apparent that variations may be made in the construction as needed without departing from the spirit of the invention except as defined in the appended claims.

I claim:

1. In an adjustable instrument dial, the combination including dial plate means, pointer means adapted to be moved with respect to said dial plate means, said dial plate means having groove means disposed adjacent the path of travel of said pointer means, movable tab means adapted to be retained in said groove means, and graduation means on said tab means, said groove means having an undercut portion, said tab means having means engageable with said undercut portion for adjustably securing said tab means in said groove means, whereby said instrument dial is adapted for adjustment by moving said tab means to place said graduation means thereon in register with said pointer means when said pointer means is at a predetermined position.

2. In an adjustable instrument dial, the combination including dial plate means, pointer means adapted to be moved with respect to said dial plate means, said dial plate means having groove means disposed adjacent the path of travel of said pointer means, movable tab means adapted to be retained in said groove means, the outer surface of said tab means being substantially flush with the outer surface of said dial plate means, and graduation means on said tab means, said groove means having an undercut portion, said tab means having means engageable with said undercut portion for adjustably securing said tab means in said groove means, whereby said instrument dial is adapted for adjustment by moving said tab means in said groove means to place said graduation means thereon in register with said pointer means when said pointer means is at a predetermined position.

3. In an adjustable instrument dial, the combination including dial plate means, pointer means adapted to be moved with respect to said dial plate means, said dial plate means being adjustably positioned with respect to a fixed position of said pointer means and having groove means disposed adjacent the path of travel of said pointer means, movable tab means adapted to be retained in said groove means, and means for adjustably securing said tab means in said groove means, whereby said instrument dial is adapted for adjustment by moving said tab means to register with said pointer means when said pointer means is at a predetermined position.

4. In an adjustable instrument dial, the combination including dial plate means, pointer means adapted to be moved with respect to said dial plate means, means for adjustably positioning said dial plate means with respect to said pointer means, said dial plate means having groove means disposed adjacent the path of travel of said pointer means, movable tab means adapted to be retained in said groove means, means for adjustably securing said tab means in said groove means, and graduation means on said tab means, whereby said instrument dial is adapted for adjustment by moving said tab means in said groove means to place said graduation means thereon in register with said pointer means when said pointer means is at a predetermined position.

5. In an adjustable instrument dial, the combination including dial plate means, pointer means adapted to be rotated with respect to said dial plate means, means for adjustably positioning said dial plate means with respect to the axis of rotation of said pointer means, said dial plate means having groove means disposed adjacent the path of travel of said pointer means, movable tab means adapted to be retained in said groove means, graduation means on said tab means, means for adjustably securing said tab means in position in said groove means, and mirror means disposed on the outer surface of said dial plate adjacent the path of travel of said pointer means for reflecting an image of at least a portion of said pointer means, said image underlying said pointer means when the observer views said pointer means and said graduations from the proper viewing angle, whereby said dial is adapted for adjustment by moving said tab means in said groove means to place said graduation means thereon in register with said pointer means when said pointer means is at a predetermined position.

References Cited in the file of this patent

UNITED STATES PATENTS

| 140,867 | Annin | July 15, 1873 |
| 1,123,269 | Frame | Jan. 5, 1915 |
| 2,215,310 | Zupaner | Sept. 17, 1940 |

FOREIGN PATENTS

| 237,035 | Great Britain | July 23, 1925 |
| 814,353 | Great Britain | June 3, 1959 |